United States Patent Office 3,060,191
Patented Oct. 23, 1962

3,060,191
HYDROXYALKYL TRIMELLIT-IMIDES
Kenneth E. Kolb, Corning, N.Y., and Benjamin A. Bolton, Gary, Ind., assignors to Standard Oil Company, Chicago, Ill., a corporation of Indiana
No Drawing. Filed Mar. 23, 1960, Ser. No. 16,913
2 Claims. (Cl. 260—326)

This invention relates to hydroxyalkyl trimellit-imide and solid polymers produced therefrom.

A new imide has been discovered which has the structural configuration:

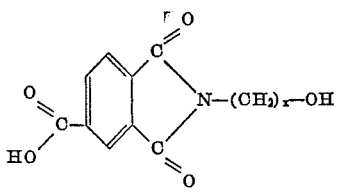

where $x$ is an integer from 2 to 8.

These imides have been designated as hydroxyalkyl trimellit-imides. They may also be considered as hydroxyalkyl imides of trimellitic anhydride.

These hydroxyalkyl trimellit-imides undergo polyesterification-condensation to form normally solid polymers which polymers can be used to form fibers.

The trimellit-imides of the invention are preparable from trimellitic anhydride and an alkanol amine having from 2 to 8 carbon atoms. Monoethanol amine is a particularly suitable alkanol amine. The trimellitic anhydride and the alkanol amine are reacted in 1:1 molar proportion. The reaction may be carried out in the presence of a suitable solvent or in the absence of a solvent. Solvents having high solvent power for trimellitic anhydride are preferred. The amide product is converted to the imide by heating the amide to the temperature at which the imide formation takes place; for example, about 250° C.

The solid polymer is prepared by heating the defined trimellit-imide under polyesterification-condensation conditions. The poly-condensation reaction is continued until a polymer of the desired melting point is reached or the poly-condensation has gone essentially to completion.

*Illustration*

One mole of trimellitic anhydride was dissolved in one liter of dimethylformamide. One mole of monoethanol amine was slowly added to the anhydride solution. A white cloudiness appeared which dispersed rapidly. As the addition continued, the solution became very hot, reaching about 70° C. When all the amine had been added, the hot solution was perfectly clear. The dimethylformamide was removed under vacuum at about 70° C. The solid product was carefully heated under vacuum at a temperature of about 150° C. while bubbles of water vapor passed off. When all indication of reactions had ceased, the heating was stopped. The hydroxyethyl trimellit-imide product was obtained in approximately 100% yield. It had a melting point of 195° C.

Some of the trimellit-imide was heated for four hours at a pressure of 1 mm. Hg and 250° C. until essential stoppage of production of water vapor. The solid polymeric product softened at 196° C. and was an extremely viscous liquid at 200° C. This liquid could be drawn into fibers.

Thus, having described the invention, what is claimed is:

1. A new imide having the structural configuration:

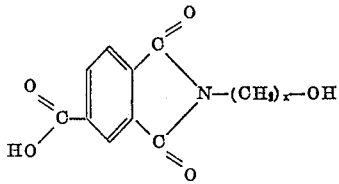

where $x$ is an integer from 2 to 8.
2. The imide of claim 1 wherein $x$ is 2.

References Cited in the file of this patent
UNITED STATES PATENTS

| | | |
|---|---|---|
| 2,463,977 | Kropa | Mar. 8, 1949 |
| 2,556,664 | Smith et al. | June 12, 1951 |
| 2,911,410 | Ramsey | Nov. 3, 1959 |